United States Patent Office 2,938,050
Patented May 24, 1960

2,938,050

PROCESS FOR THE RECOVERY OF TEREPHTHALIC ACID AND ALKALIES FROM SOLUTIONS CONTAINING ALKALI METAL SALTS OF TEREPHTHALIC ACID

Hubert Schirp, Dusseldorf, and Werner Stein, Dusseldorf-Holthausen, Germany, assignors to Henkel & Cie. G.m.b.H., Dusseldorf-Holthausen, Germany, a corporation of Germany No Drawing. Filed June 11, 1956, Ser. No. 590,371

Claims priority, application Germany Nov. 24, 1955

5 Claims. (Cl. 260—515)

This invention relates to a process for the recovery of terephthalic acid and alkalies from solutions containing alkali metal salts of terephthalic acid, and more particularly to such a recovery process employing alkali earth metal salts of aromatic carboxylic acids as the principal separation reagent.

In the production of alkali metal salts of terephthalic acid which comprises heating the alkali metal salts of such mononuclear aromatic carboxylic acids as orthophthalic acid, isophthalic acid, benzoic acid and benzene polycarboxylic acids to temperatures above 340° C. in an inert atmosphere, especially in an atmosphere of carbon dioxide, as disclosed in copending applications Ser. No. 392,512, filed November 16, 1953, now abandoned, Ser. No. 395,609, filed December 1, 1953, now abandoned, and Ser. No. 582,087, filed May 2, 1956, a reaction product is obtained which contains substantial quantities of alkali metal terephthalates. The copending applications above referred to further disclose a method of separating terephthalic acid from the reaction product which comprises dissolving the soluble components of the reaction product, including the alkali metal terephthalate, in water and acidifying the resulting aqueous solution with an acid which is stronger than terephthalic acid, particularly with hydrochloric or sulfuric acid. The acidification of the solution transforms the alkali metal terephthalate into terephthalic acid which precipitates out, while the alkali metal cation combines with the anion of the stronger acid to form the soluble, neutral-reaction salt of the stronger acid which remains in solution.

While the above-described method of recovering terephthalic acid from such aqueous solutions produces virtually quantitative yields of pure terephthalic acid, it has a serious disadvantage in that the alkali metal is recovered in a form which is not suitable for direct reemployment as a starting material for the production of more terephthalic acid by the heat treatment method disclosed in said copending applications. In other words, the soluble alkali metal salt remaining in solution after the terephthalic acid has precipitated is neither capable of being rearranged into an alkali metal terephthalate by the heat treatment nor suitable for the formation of alkali metal salts of mononuclear carboxylic acids which are heated under the stated conditions to form alkali metal terephthalates. In order to be made suitable for the latter purpose, the acidified aqueous solution of the soluble alkali metal salt formed during the precipitation of the terephthalic acid must be evaporated to dryness and the dry alkali metal salt obtained thereby must then be transformed by separate reactions into the corresponding alkali metal hydroxide or carbonate. Only in that form can the alkaline salts be used to form alkali metal salts of aromatic carboxylic acids capable of being rearranged into alkali metal terephthalates.

It is an object of the present invention to provide a method for the recovery of terephthalic acid from aqueous solutions comprising substantial quantities of an alkali metal terephthalate, which will not only produce virtually quantitative yields of pure terephthalic acid, but also enable the alkali metal salt remaining in solution after the precipitation of the terephthalic acid to be used directly for the production of more alkali metal terephthalate.

Other objects and advantages of the present invention will become apparent as the description thereof proceeds.

We have found that the above-indicated objects are achieved and that the disadvantages of the prior methods are overcome by adding to the aqueous solution of the rearrangement reaction product an alkali earth metal salt of an aromatic carboxylic acid the alkali metal salts of which are capable of undergoing rearrangement into alkali metal terephthalates by heating to temperatures above 340° C. in an inert atmosphere, as above set forth.

The alkali earth metal salt of the aromatic carboxylic acid reacts with the alkali metal terephthalate in solution to form an alkali earth metal terephthalate which is relatively insoluble in water and precipitates from the solution, and an alkali metal salt of the aromatic carboxylic acid which is relatively soluble in water and remains in solution. The precipitated alkali earth metal terephthalate is then filtered off and reacted with an acid capable of releasing the alkali earth metal atom from the terephthalate, preferably with an inorganic acid. In this manner, insoluble free terephthalic acid is precipitated and a soluble alkali metal salt of the aromatic carboxylic acid is left behind in solution. The alkali metal carboxylate may then be isolated from the solution, for example by evaporating the liquid, and without further change again subjected to the above-described heat treatment in an inert atmosphere to form more alkali metal terephthalate.

The phrase "aromatic carboxylic acids the alkali metal salts of which are capable of undergoing rearrangement into alkali metal terephthalates" as used herein, is intended to include mononuclear aromatic carboxylic acids with one or more carboxyl radicals attached to a benzene ring. In addition to benzoic acid, orthophthalic acid and isophthalic acid, the group therefore also includes benzene tricarboxylic, tetracarboxylic, pentacarboxylic and hexacarboxylic acids. The rearrangement of alkali metal salts of aromatic carboxylic acids having three or more carboxyl groups attached to the benzene ring is particularly described in said copending application Ser. No. 582,087.

The process herein disclosed is particularly well adapted for the recovery of terephthalic acid and the alkali metal salt from aqueous solutions containing substantial quantities of dipotassium terephthalate. However, aqueous solutions containing substantial quantities of other alkali metal terephthalates, such as disodium terephthalate, dirubidium terephthalate, dilithium terephthalate and dicesium terephthalate may be treated in an analogous fashion with substantially the same results.

The alkali earth metal salt of the aromatic carboxylic acid added to the alkali metal terephthalate solution in accordance with the present invention is preferably a calcium salt, primarily for reasons of economy and accessibility, but the corresponding salts of other alkali earth metals, such as strontium or barium, may also be used. It is not necessary to add the alkali earth metal salt of the aromatic carboxylic acid itself to the solution; the same results are achieved by adding a mixture of compounds which forms the alkali earth metal salt in situ; for example, the alkali earth metal terephthalate may be precipitated from the solution by adding a mixture consisting of an alkali earth metal hydroxide or carbonate and the desired aromatic carboxylic acid or its anhydride. Similarly, the components of the mixture may be added to the solution separately and in any desired sequence; for example, the alkali earth metal hydroxide or carbonate may be added to the solution first, and the aromatic carboxylic acid or its anhydride may be added thereafter, or vice-versa.

For the recovery of very pure terephthalic acid by the process according to the present invention, it is preferred that the rearrangement reaction product dissolved in the aqueous solution serving as the starting material for the present process does not contain an excessive amount of untransformed starting material or other aromatic carboxylic acid salts formed as side products during the rearrangement reaction. For optimum results, the content of such impurities in the rearrangement reaction product should be less than 20% by weight based on the amount of terephthalate in the product, and preferably less than 10% by weight.

The concentration of the aqueous solution of the rearrangement product containing alkali metal terephthalate may vary within rather wide limits, but the concentration of alkali metal terephthalate in the solution should be at least such that the limit of solubility of the alkali earth metal terephthalate is exceeded at the prevailing temperature when the alkali earth metal salt of the aromatic carboxylic acid is added to the solution. In most instances, however, the concentration of alkali metal terephthalate in the solution treated in accordance with the present invention will be considerably higher than the above-stated minimum amount; it may even be as high as the saturation point. The process disclosed herein is even operative with saturated solutions which contain additional quantities of suspended, undissolved rearrangement reaction product, because the terephthalate component will dissolve in the course of the reaction with the alkali earth metal salt of the aromatic carboxylic acid and re-precipitate in the form of the alkali earth metal terephthalate. Moreover, the concentration of dissolved and suspended rearrangement reaction product may be so high that a saturated solution of the aromatic alkali metal carboxylate is formed by the addition of the aromatic alkali earth metal carboxylate to the solution.

In general, the amount of alkali earth metal salt added to the solution will be such that it is just sufficient to precipitate all of the alkali metal terephthalate in the solution in the form of the relatively insoluble alkali earth metal terephthalate. However, the addition of an excess amount of the alkali earth metal carboxylate is not objectionable; in fact it may be desirable under certain circumstances to assure complete precipitation of the terephthalate.

The reaction between the alkali metal terephthalates and the aromatic alkali earth metal carboxylates proceeds completely and smoothly over a wide temperature range. In general, it is carried out at a temperature between about 10° C. and the boiling point of the aqueous solution, and preferably at a temperature between 70° C. and 120° C. However, the reaction may also be carried out, if desired, at more elevated temperatures up to about 150° C., even if it becomes necessary to work at elevated pressures.

As previously stated, the addition of the aromatic alkali earth metal carboxylate to the aqueous solution of the rearrangement reaction product produces a precipitate of alkali earth metal terephthalate and an aqueous solution containing essentially the alkali metal salt of the aromatic carboxylic acid in addition to small amounts of the alkali metal salts of other aromatic carboxylic acids which may have been present as side-products and/or impurities in the rearrangement reaction product. The precipitate may be separated from the solution by any suitable method, for example by filtration or centrifuging, and is then thoroughly washed with water to remove any adhering solution and/or impurities, such as salts of benzoic acid, isophthalic acid or orthophthalic acid. The filtrate may then be spray-dried or evaporated in any other suitable manner to yield the dry alkali metal salt of the aromatic carboxylic acid dissolved therein. The dry alkali metal salt is ready to be re-subjected to the rearrangement reaction in accordance with the processes disclosed in said copending applications to produce more alkali metal terephthalate, without having to undergo any additional transformation.

The filter cake, i.e. the precipitated alkali earth metal terephthalate, is thereafter reacted with an acid which liberates free terephthalic acid and simultaneously forms a soluble alkali earth metal salt. Examples of suitable such acids are hydrochloric acid, nitric acid, carbonic acid, formic acid and acetic acid. The insoluble terephthalic acid formed thereby precipitates out and is separated by filtration and thoroughly washed with water.

Alternate methods of recovering terephthalic acid from the alkali earth metal terephthalate comprise pouring the acid directly over the alkali earth metal terephthalate while it is still on the filter, or suspending the alkali earth metal terephthalate in water and thereafter adding the acid to this suspension. Whatever the method employed, the precipitation of terephthalic acid may be carried out at temperatures from 10° C. to 120° C., and the concentration of the acid reacted with the alkali earth metal terephthalate may vary within wide limits, anywhere from dilute acid to commercial grade concentrated acid. In general, the concentration of the acid should be such that enough water is present to dissolve completely all of the soluble alkali earth metal salts formed by the reaction.

If it is desired to recover the soluble alkali earth metal salt after the precipitation of the terephthalic acid, it is advantageous to employ acid solutions containing upwards of 15% acid. However, if a recovery of the alkali earth metal values is not contemplated, dilute solutions containing as little as 1% by weight of acid may be employed. In the event that carbonic acid is selected as the acid agent for the conversion of the alkali earth metal terephthalate into terephthalic acid and soluble alkali earth metal carbonate, it is advantageous to carry out the conversion in a pressure vessel at elevated pressures, because carbonic acid is less soluble in water than the other suitable acids mentioned above and tends to decompose into carbon dioxide and water at the prevailing temperature. Carbon dioxide pressures up to 50 kg./cm.$^2$ are advantageously employed in the pressure vessel to retain the carbonic acid in solution.

The terephthalic acid produced by the process in accordance with the present invention is extremely pure, since it is precipitated twice—first as the alkali earth metal terephthalate and then as free terephthalic acid. Of course, the free terephthalic acid may, if desired, be further purified by washing with hot water or suitable solvents, or in any other advantageous manner.

To summarize, then, the process in accordance with the present invention not only produces very good yields of pure terephthalic acid, but also enables the alkali metal to be recovered in a form which makes it possible to be used directly and without further conversion as starting material for the production of more alkali metal terephthalate and hence terephthalic acid by the methods described in said copending applications.

The following examples will further illustrate the present invention and enable others skilled in the chemical arts to understand the invention more completely. It must be understood, however, that our invention is not limited to the particular materials and conditions recited in the examples below.

*Example I*

Dry dipotassium orthophthalate was heated to temperatures above 340° C. in an inert atmosphere until a reaction product containing a substantial amount of dipotassium terephthalate was formed. The reaction product was admixed with water in an amount sufficient to form a saturated solution of dipotassium terephthalate having, in addition, undissolved dipotassium terephthalate suspended therein. In all, the saturated aqueous suspension contained 60.5 gm. dipotassium terephthalate in 150 cc. water. The suspension was then heated to about 100° C., and 20.35 gm. technical grade calcium hydroxide (86.2% calcium hydroxide and 12.0% calcium carbonate) were added to the hot suspension over a period of about 10 minutes while stirring. Thereafter, 37.0 gm. phthalic acid anhydride were stirred into the suspension, and the resulting reaction mixture was held at about 100° C. for approximately one hour. After cooling to substantially room temperature, the calcium terephthalate which had precipitated out was separated from the aqueous phase by filtration on a vacuum filter, and the filter cake was washed with about 100 cc. water. The yield of calcium terephthalate was 51.9 gm., corresponding to a terephathalic acid content of 95.5% of that contained in the original saturated dipotassium terephthalate suspension. In addition, the calcium terephthalate contained about 2.2% of the phthalic acid originally used. Potassium could not be analytically detected in the calcium salt. The filtrate and the wash water were combined and the combined solution yielded 62.2 gm. dipotassium orthophthalate upon evaporation to dryness. The dry salt contained 98% of the phthalic acid added to the suspension, 3.2% of the terephthalic acid originally used, and 0.2% calcium; it was again heated to temperatures above 340° C. in an inert atmosphere to produce more dipotassium terephthalate.

Substantially the same result was obtained when an equivalent amount of calcium phthalate was added to the saturated dipotassium terephthalate suspension in place of calcium hydroxide and phthalic acid anhydride.

*Example II*

A mixture of 20.75 gm. isophthalic acid, 9.40 gm. calcium hydroxide and 75 cc. of water was heated to 100° C. while stirring; thereafter, raw potassium terephthalate, obtained by heating potassium isophthalate to temperatures above 340° C. in an inert atmosphere, was added to this mixture in such quantity that 30.25 gm. of dipotassium terephthalate were contained therein, and the reaction mixture was stirred for an additional half hour at a temperature of about 90° C.

After the solution had cooled, the calcium terephthalate precipitated thereby was filtered off on a vacuum filter, washed with water and admixed with an excess of hot hydrochloric acid. Terephthalic acid precipitated out and was filtered off on a vacuum filter and washed with hot alcohol. 19.36 gm. of pure terephthalic acid, corresponding to 93.4% of the amount theoretically recoverable from the dipotassium terephthalate originally used, were recovered in this manner. The washed alcohol contained 0.9 gm. isophthalic acid, which corresponds to 4.3% of the amount originally used. The filtrate from the calcium terephthalate precipitate contained 95% of the isophthalic acid and 6% of the terephthalic acid, both in the form of their dipotassium salts, which were isolated by evaporation and again subjected to the heat treatment in an inert atmosphere to form more dipotassium terephthalate.

*Example III*

A mixture of 9 gm. of calcium benzoate and 40 cc. water was heated to about 90° C. while stirring, and then raw dipotassium terephthalate, produced by heating potassium benzoate under pressure of carbon dioxide, was added to the mixture in such quantities that the resulting mixture contained 7.72 gm. dipotassium terephthalate; stirring was then continued for 10 minutes at the same temperature. After cooling, the precipitated calcium terephthalate was filtered off on a vacuum filter and washed with water. It contained 83.2% of the terephthalic acid theoretically recoverable and 13.4% of the benzoic acid originally used. The filtrate contained 83.5% of the benzoic acid and 16% of the terephthalic acid originally used, both in the form of their potassium salts. Upon evaporation of the filtrate the dry solids were again subjected to a heat treatment above 300° C. to produce more dipotassium terephthalate.

The calcium terephthalate was analyzed, but no potassium was found. The content of calcium in the potassium salts was 0.8%.

While we have illustrated our invention by reciting certain specific embodiments thereof, it will be apparent that various changes and modifications may be made without departing from the spirit of the invention or the scope of the appended claims.

We claim:

1. In a continuous process for producing terephthalic acid by the rearrangement of alkali metal salts of mononuclear aromatic carboxylic acids other than terephthalic acid to form a reaction mixture containing alkali metal terephthalate from which the terephthalic acid may be obtained, the improvement which comprises the steps of reacting the alkali metal terephthalate in said reaction mixture with an alkali earth metal salt of a mononuclear aromatic carboxylic acid other than terephthalic acid in the presence of sufficient water to form a solution containing at least 10% by weight of the terephthalic acid salts, at a temperature of about 70° C. to about 150° C., to form a relatively insoluble alkali earth metal salt of terephthalic acid and a relatively soluble alkali metal salt of said aromatic carboxylic acid, separating the alkali earth metal terephthalate from the aqueous phase, reacting the alkali earth metal terephthalate with an aqueous solution of an acid capable of liberating terephthalic acid and of binding the alkali earth metal in the form of a soluble salt of said acid, separating the terephthalic acid from the reaction mixture and recycling the relatively soluble alkali metal salt of aromatic carboxylic acids to the rearrangement reaction.

2. In a continuous process for producing terephthalic acid by the rearrangement of alkali metal salts of mononuclear aromatic carboxylic acids other than terephthalic acid to form a reaction mixture containing alkali metal terephthalate from which the terephthalic acid may be obtained, the improvement which comprises the steps of admixing said reaction mixture with water at a temperature of about 70° C. to about 150° C. to form an aqueous solution of said alkali metal terephthalate containing at least 10% by weight of the acid salt, adding an alkali earth metal salt of a mononuclear carboxylic acid other than terephthalic acid to said solution in sufficient quantity to precipitate the corresponding alkali earth metal terephthalate from said solution, separating the precipitated alkali earth metal terephthalate from the aqueous phase which contains a relatively soluble alkali metal salt of the mononuclear aromatic carboxylic acid, reacting the alkali earth metal terephthalate with an acid capable of binding the alkali earth metal in the form of a soluble alkali earth metal salt of said acid and of liberating insoluble free terephthalic acid, separating the terephthalic acid from the reaction mixture and recycling the relatively soluble alkali metal salt of aromatic carboxylic acids to the rearrangement reaction.

3. In a continuous process for producing terephthalic acid by the rearrangement of a potassium salt of a benzene carboxylic acid other than terephthalic acid to form a reaction mixture containing potassium terephthalate from which the terephthalic acid may be obtained, the improvement which comprises the steps of dissolving the dipotassium terephthalate in sufficient water to form a solution containing at least 10% by weight of the potassium terephthalate, at a temperature of about 70° C. to about 150° C., adding the calcium salt of a benzene carboxylic acid other than terephthalic acid to the solution in sufficient quantity to precipitate calcium terephthalate from the solution, separating the calcium terephthalate from the aqueous phase which contains a relatively soluble potassium salt of the benzene carboxylic acid, reacting the calcium terephthalate with an aqueous hydrochloric acid solution in sufficient quantity to convert the calcium terephthalate into free terephthalic acid, separating free terephthalic acid from the acid solution, and recycling the relatively soluble potassium salt of the benzene carboxylic acid to the rearrangement reaction.

4. In a continuous process for producing terephthalic acid by the rearrangement of a potassium salt of a benzene carboxylic acid other than terephthalic acid to form a reaction mixture containing potassium terephthalate from which the terephthalic acid may be obtained, the improvement which comprises the steps of dissolving the dipotassium terephthalate in sufficient water to form a solution containing at least 10% by weight of the potassium terephthalate, adding a mixture of compounds forming a calcium salt of a benzene carboxylic acid other than terephthalic acid in aqueous solution to said solution at a temperature of about 70° C. to about 150° C. in sufficient quantity to precipitate calcium terephthalate from the solution, separating the calcium terephthalate from the aqueous phase which contains a relatively soluble potassium salt of the benzene carboxylic acid, reacting the calcium terephthalate with an aqueous hydrochloric acid solution in sufficient quantity to convert the calcium terephthalate into free terephthalic acid, separating terephthalic acid from the acid solution, and recycling the relatively soluble potassium salt of the benzene carboxylic acid to the rearrangement reaction.

5. In a continuous process for producing terephthalic acid by the rearrangement of alkali metal salts of mononuclear aromatic carboxylic acids other than terephthalic acid to form a reaction mixture containing alkali metal terephthalate from which the terephthalic acid may be obtained, the improvement which comprises the steps of forming a mixture of the alkali metal terephthalate-containing reaction product and an alkaline earth metal salt of a mononuclear carboxylic acid other than terephthalic acid in an aqueous medium, reacting said alkali metal terephthalate and said alkaline earth metal salt of an aromatic carboxylic acid to form a relatively insoluble alkaline earth metal terephthalate and a relatively soluble alkali metal salt of said aromatic carboxylic acid, wherein the concentration of said alkali metal terephthalate in the mixture is at least such that the limit of solubility of the alkaline earth metal terephthalate formed is exceeded, separating the alkali earth metal terephthalate from the aqueous phase, reacting the alkali earth metal terephthalate with an aqueous solution of an acid capable of liberating terephthalic acid and of binding the alkali earth metal in the form of a soluble salt of said acid, separating the terephthalic acid from the reaction mixture and recycling the relatively soluble alkali metal salt of aromatic carboxylic acids to the rearrangement reaction.

References Cited in the file of this patent

UNITED STATES PATENTS 2,697,723     Carlston et al. _____ Dec. 21, 1954

OTHER REFERENCES

Smith: J.A.C.S., vol. 43 pp. 1920–1921 (1921).
Kharasch et al.: Essentials of College Chemistry, pp. 200–202 (1942).
Heilbron: Dictionary of Organic Compounds, IV, p. 404 (1953).